(12) United States Patent
Fleet, Sr.

(10) Patent No.: US 9,227,570 B2
(45) Date of Patent: Jan. 5, 2016

(54) TRUNK CADDY INSERT

(71) Applicant: Clyde V. Fleet, Sr., Silver Spring, MD (US)

(72) Inventor: Clyde V. Fleet, Sr., Silver Spring, MD (US)

(*) Notice: Subject to any disclaimer, the term of this patent is extended or adjusted under 35 U.S.C. 154(b) by 0 days.

(21) Appl. No.: 14/285,553

(22) Filed: May 22, 2014

(65) Prior Publication Data

US 2014/0367436 A1 Dec. 18, 2014

Related U.S. Application Data

(60) Provisional application No. 61/826,410, filed on May 22, 2013.

(51) Int. Cl.
*B60R 7/00* (2006.01)
*B60R 7/02* (2006.01)

(52) U.S. Cl.
CPC ........................................ *B60R 7/02* (2013.01)

(58) Field of Classification Search
CPC .............. B60R 7/00; B60R 7/02; B60R 7/08; B60R 5/00; B60R 5/045
See application file for complete search history.

(56) References Cited

U.S. PATENT DOCUMENTS

| | | | | |
|---|---|---|---|---|
| 3,726,422 | A * | 4/1973 | Zelin | 414/522 |
| 4,305,695 | A * | 12/1981 | Zachrich | 414/522 |
| 4,718,584 | A * | 1/1988 | Schoeny | 224/42.34 |
| 4,733,898 | A * | 3/1988 | Williams | 296/24.32 |
| 4,884,733 | A * | 12/1989 | Geeves | 224/311 |
| 5,031,769 | A * | 7/1991 | Shea et al. | 206/335 |
| 5,161,700 | A * | 11/1992 | Stannis et al. | 211/175 |
| 5,167,433 | A * | 12/1992 | Ryan | 296/37.1 |
| 5,469,999 | A * | 11/1995 | Phirippidis | 224/542 |
| 5,518,170 | A * | 5/1996 | Rasmussen | 229/120.26 |
| D372,016 | S * | 7/1996 | Wolford | D12/414.1 |
| 5,603,439 | A * | 2/1997 | Pineda | 224/403 |
| 5,819,996 | A * | 10/1998 | Koons, Jr. | 224/42.34 |
| 5,996,868 | A * | 12/1999 | Paradis | 224/404 |
| 6,003,924 | A * | 12/1999 | Nicol et al. | 296/37.6 |
| 6,318,781 | B1 * | 11/2001 | McKee | 296/26.09 |
| 7,959,390 | B2 * | 6/2011 | Gorski | 410/121 |
| 2009/0096239 | A1 * | 4/2009 | Martin | 296/37.6 |
| 2014/0284365 | A1 * | 9/2014 | Smith et al. | 224/404 |

* cited by examiner

*Primary Examiner* — Brian D Nash
(74) *Attorney, Agent, or Firm* — Ruth Eure

(57) ABSTRACT

The Trunk Caddy Insert (TCI) is an essentially rectangular storage system having a small rectangle along one long side to accommodate the tapered shape of many trunks and cargo areas. The Trunk Caddy Insert components interlock and snap together easily and securely to accommodate a variety of trunk spaces, cargo areas and personal preferences. TCI is manufactured in a variety of lengths, widths and configurations to accommodate the schematics of various motor vehicles on the market.

17 Claims, 4 Drawing Sheets

TRUNK CADDY INSERT

CLAIM OF PRIORITY

This patent application claims priority under 35 USC 119 (e) (1) from U.S. Provisional Patent Application Ser. No. 61/826,410 filed May 22, 2013, of common inventorship herewith entitled, "Trunk Caddy Insert."

FIELD OF THE INVENTION

The present invention pertains to the field of vehicle accessories, and more specifically to the field of vehicular storage accessories.

BACKGROUND OF THE INVENTION

The prior art has put forth several designs for vehicular storage accessories. Among these are:

US Patent 2004/0118854 to Lawrence Kutun describes an apparatus for storing and organizing articles within a defined space. The apparatus is collapsible and includes exterior panels, a base panel and a panel opposite the base. The interior of the apparatus is composed of a plurality of panels that are arranged to form compartments of varying sizes.

US Patent 2004/0052605 to Gary Steven Strumolo describes a cargo containment apparatus formed from a series of individual panels linked together to permit deployment in a variety of configurations for containing cargo items within a larger cargo area of an automotive vehicle. The linked panels of the cargo containment apparatus are pivotable relative to one another to permit substantial flexibility in the apparatus to attain a shape that corresponds to the items to be transported in the cargo area. The panels are formed with bag hooks that are engagable with the handles of conventional plastic grocery bags and tote bags for effectively restraining movement within the automotive cargo area. Pins on the bottom surfaces of the panels engage the carpet in the automotive cargo area to restrict the movement of the cargo containment apparatus within the automotive cargo area.

U.S. Pat. No. 5,819,996 to Robert Patrick Coons, Jr. describes an improved organizer for the storage space of a vehicle, comprising exterior and interior wall members defining a plurality of storage area subdivisions. Slidable dividers are mounted in hollow wall members. The dividers are opened and closed to achieve the desired organizational configuration. To enhance security and organization of items, holes are provided along the top edges of the exterior wall members for the attachment of covers or straps. Gripping members are provided along the bottom edges of the exterior walls to prevent unwanted movement of the organizer in the storage space.

None of these prior art references describe the present invention.

SUMMARY OF THE INVENTION

It is an object of the present invention to provide a storage and organizational system for use in a vehicle's trunk or rear cargo area.

DETAILED DESCRIPTION OF THE INVENTION

With a continuing sprawl of urbanization and an increasing preference of an automobile as a cost effective mode of travel, many people are spending more and more time behind the wheel. Motorists drive children to school and recreational activities, take necessary trips to the market for supplies and embark on spontaneous weekend road adventures. With automobiles being so essential to daily life, motorists endeavor to keep them in tiptop shape at all times with routine maintenance checks with auto professionals or by keeping a supply of motor oil, antifreeze, power steering fluid and other lubricating liquids in the trunk of the vehicle. A handy storage area, the trunk sometimes becomes a catch all for necessary automobile supplies. Emergency items such as a spare gas can, jumper cables, water and various tools also wrestle for space in both small and large trunk areas. Trunks are utilized to store and transport a variety of goods including groceries, sporting equipment such as golf bags and fishing gear, luggage and a virtually limitless array of personal items and accessories. After a short drive, motorists often open their trunks to see all these supplies scattered all over the trunk.

The present invention, hereinafter referred to as the TCI is essentially rectangular having a small rectangle along one long side to accommodate the tapered shape of many trunks and cargo areas. Trunk Caddy Insert or TCI, is an essentially rectangular storage and organizing system utilized in the trunk or rear cargo area of an automobile. TCI provides motorists with a neat and accessible means of managing these items while also increasing the amount of storage space available in the trunk. TCI is available as an aftermarket accessory retrofitted to an existing vehicle trunk or as an optional upgrade in newly manufactured motor vehicles. The Trunk Caddy Insert components interlock and snap together easily and securely to accommodate a variety of trunk spaces, cargo areas and personal preferences. TCI is manufactured in a variety of lengths, widths and configurations to accommodate the schematics of various motor vehicles on the market. TCI is manufactured from a hardened and shatterproof plastic or rubber material.

Figure 2:
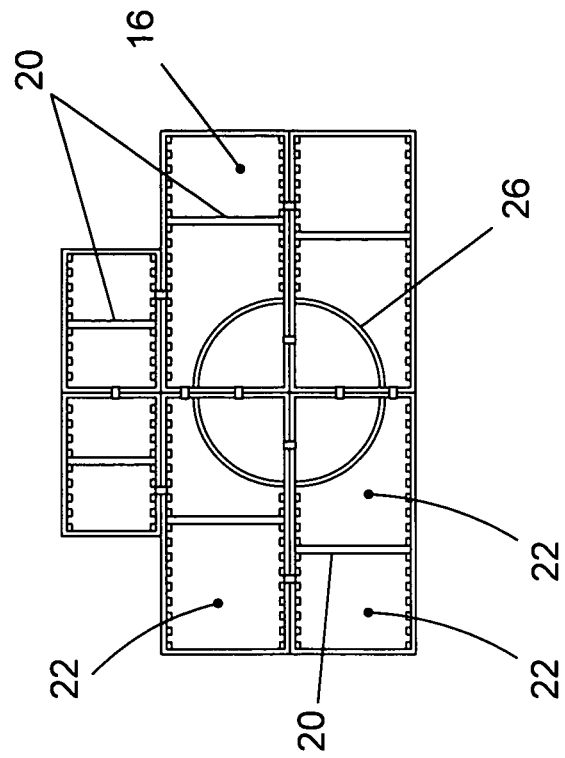
FIG. 2 is a perspective illustrative view showing an example of all available storage and functionality including pie shaped removal bins, removable and adjustable partition slots.
Figure 1:
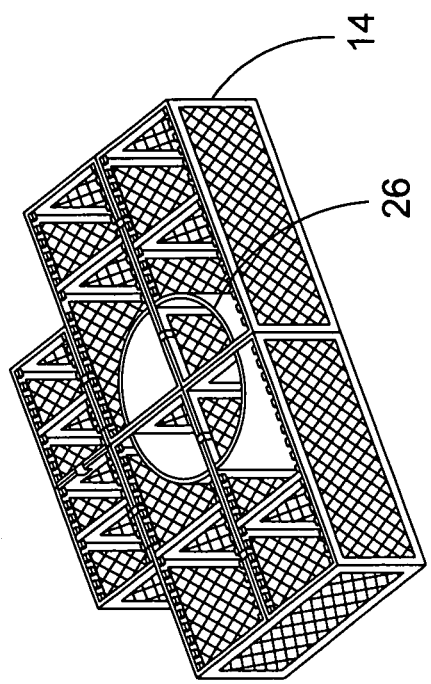
FIG. 1 is a perspective diagonal view of the present invention showing a circular bin holder that functions as a spare tire access point.
Figure 4:
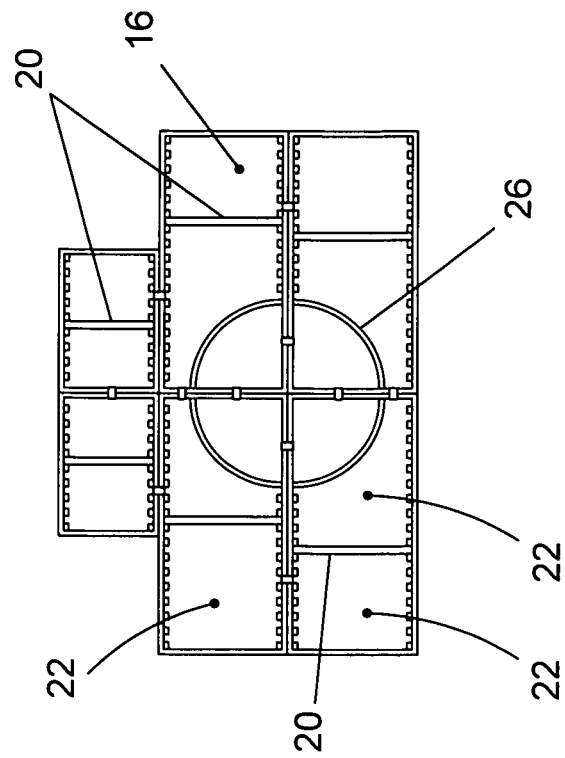
FIG. 4 is a perspective illustrative view showing another example of available storage and functionality including pie shaped removal bins, removable and adjustable partition slots.
Figure 5:
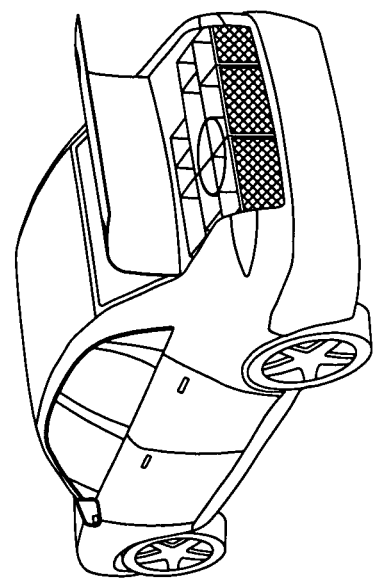
FIG. 5 is a perspective functional view showing the present invention horizontally installed in a car trunk.
Figure 7:
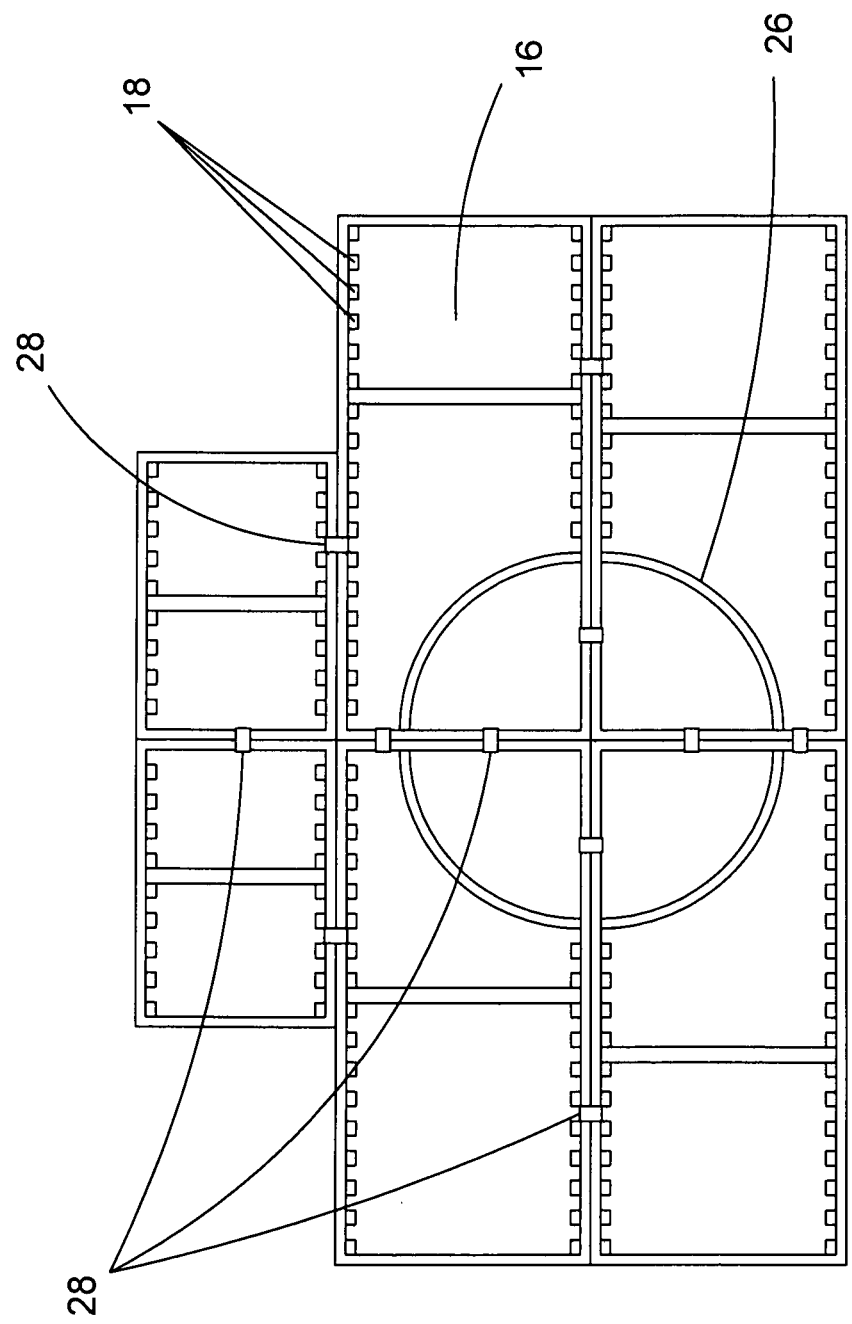
FIG. 7 is a top view of the present invention showing clips or fasteners which secure partitions in slotted fittings.

A first embodiment of the Trunk Caddy Insert stacks and loads horizontally into a car trunk. This embodiment is shown in FIG. 5. This embodiment encompasses the interior of the trunk completely, comprising a series of raised side walls 14, shown in FIG. 1, that run around the perimeter and abut flush against the interior walls of the trunk. These outer support walls 14 measure approximately eight to ten inches in total height. The walls house bins, shown in FIGS. 2, 4 and 7, of TCI which contain a series of slotted fittings 18 running horizontally across the surface. A series of removable panels or partitions 20, shown in FIGS. 2 and 4, are insertable vertically into these fittings and stand upright to serve as retaining walls that divide TCI into several individual storage compartments 22. Partitions 20 are secured by means of clips or fasteners 26, shown in FIG. 7. These panels 20 are available in various lengths. A user positions each panel to accommodate their specific needs. A circular access panel 26 is positioned directly above the vehicle tire well and provides unfettered access to the vehicle's spare tire.

Figure 6:
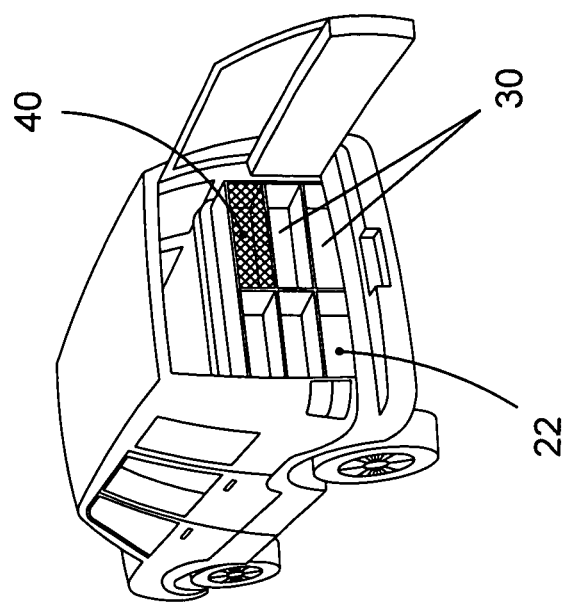
FIG. 6 is a perspective functional view showing the present invention vertically installed in the rear cargo area of a Sports Utility Vehicle or SUV.

A second embodiment of the Trunk Caddy Insert is manufactured to stack and load vertically into the back of a van or SUV, shown in FIG. 6. This embodiment further comprises individual mesh covers 40 secured over the opening of each bin 22 to prevent items from falling out.

Using TCI is simple and straight forward. A user selects a Trunk Caddy Insert that is sized and shaped appropriately to fit their vehicle trunk or rear cargo area. To assemble the present invention, the user inserts individual divider panels into gridded fittings which run horizontally across the base of TCI. These divider panels divide TCI into a series of small and large storage compartments in accordance to the user's specific storage needs. A sports enthusiast may organize TCI as follows. Positioned on the left side of the unit, the user creates three square shaped bins designed expressly for storing grocery bags. Running lengthwise across the front end of TCI, the user creates an elongated bin for use in storing tools and accessory items. A smaller square shaped bin is built directly to the right and above this bin, a place for storing engine oil, headlamps, anti freeze and snow scrapers. Running parallel with the tool accessory bin, yet significantly larger in width, the user creates an oversize storage compartment that readily accommodates a golf bag. Smaller compartments are spaced along the top of the unit for storing a tackle box, fishing rod and other gear. Each user has flexibility in adjusting the size and shape of TCI's individual storage compartments as appropriate for their needs. Once fully assembled, the designated configuration is left in place or changed periodically to accommodate a motorist's changing storage needs. To temporarily access the entire trunk bed or a portion thereof, a user can simply return the trunk to its original state by removing all or part of the individual storage receptacles, i.e. "bins."

Figure 3:
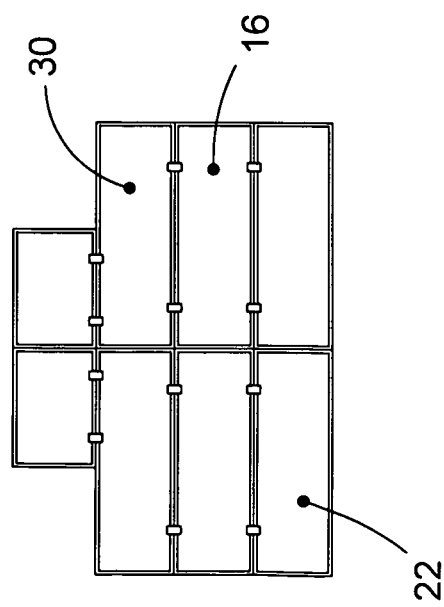
FIG. 3 is a perspective illustrative view showing eight bins of available storage with partitions removed.

Please refer to FIG. 3. Removal of bin #4 and bin #8 clears row 1. Additionally, removal of bin #3 and bin #7, clears row 2. All bins can be removed, if desired. The great convenience of the removability of the bins allows modification of trunk space in a matter of seconds. For example, if a parent is moving their teenager's small furnishings to a college dorm, the trunk space can be modified to generate whatever trunk space is required.

The individual storage receptacles are so light and convenient that even a young old child can remove and insert the TCI, when emptied.

The individual storage receptacles can be secured to the floor of the trunk using hook and loop fasteners.

Also, items placed inside the individual storage receptacles can be stored in the individual storage receptacles when removed from the trunk and will stay in place until returned to the trunk.

TCI provides motorists with a simple and efficient means of housing needed accessories in a neat and secure manner. This compartmentalized system provides individual storage receptacles within a trunk interior. Once a Trunk Caddy Insert has been assembled and stocked, a motorist just opens the trunk area and quickly accesses a needed item without having to dig through a mess to find it. By providing an organized means of storing goods, TCI frees much needed cargo room in the trunk for carrying other items. Universal in configuration, there is a Trunk Caddy Insert to accommodate any car or SUV with a rear cargo area. Made of high quality materials, TCI will provide years of continued use.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. A storage and organizational system for use in a vehicle trunk or rear cargo area, the vehicle trunk or rear cargo area having a perimeter, an interior wall defining the perimeter, and a vehicle tire well for holding a spare tire, comprising:
a series of raised side walls extending around the perimeter and abutting flush against the interior walls, the raised side walls surrounding a plurality of removable bins; and
a circular access panel positioned directly above the vehicle tire well to provide access to a spare tire.

2. The storage and organizational system of claim 1 wherein the removable bins contain a series of slotted fittings running horizontally across the surface wherein the slotted fittings are capable of receiving one or more removable panels or partitions insertable vertically into these fittings and stand upright to serve as retaining walls that divide the bins into several individual storage compartments.

3. The storage and organizational system of claim 2 wherein partitions are secured by means of clips or fasteners.

4. The storage and organizational system of claim 2, wherein the bins and side walls are manufactured in a variety of lengths, widths and configurations to accommodate the schematics of various motor vehicles on the market.

5. The storage and organizational system of claim 2, wherein the components of the system are manufactured from a hardened and shatterproof plastic or rubber material.

6. The storage and organizational system of claim 2, wherein the system loads horizontally into a car trunk.

7. The storage and organizational system of claim 2, wherein the system stacks vertically into the cargo area of an SUV.

8. The storage and organizational system of claim 2, wherein the outer support walls measure approximately eight to ten inches in total height.

9. The storage and organizational system of claim 2, wherein the system stacks vertically into the cargo area of an SUV.

10. The storage and organizational system of claim 9, further comprising individual mesh covers secured over the opening of each bin to prevent items from falling out.

11. The storage and organizational system of claim 1, wherein the bins and side walls are manufactured in a variety of lengths, widths and configurations to accommodate the schematics of various motor vehicles on the market.

12. The storage and organizational system of claim 1, wherein the components of the system are manufactured from a hardened and shatterproof plastic or rubber material.

13. The storage and organizational system of claim 1, wherein the system loads horizontally into a car trunk.

14. The storage and organizational system of claim 1, wherein the system stacks vertically into the cargo area of an SUV.

15. The storage and organizational system of claim 14, further comprising individual mesh covers secured over the opening of each bin to prevent items from falling out.

16. The storage and organizational system of claim 1, wherein the outer support walls measure approximately eight to ten inches in total height.

17. A storage and organizational system for use in a vehicle trunk or rear cargo area, comprising: an essentially rectangular storage and organizing system for use in the trunk or rear cargo area of an automobile comprising a series of raised side walls, that run around the perimeter and abut flush against the interior walls of the trunk, wherein the raised side walls surround a plurality of removable bins wherein the removable bins contain a series of slotted fittings running horizontally across the surface wherein the slotted fittings are capable of receiving one or more removable panels or partitions insertable vertically into these fittings and stand upright to serve as retaining walls that divide the bins into several individual storage compartments, and further comprising a circular access panel positioned directly above the vehicle tire well to provide access to a spare tire.

* * * * *